US006602306B2

United States Patent
Scott et al.

(10) Patent No.: US 6,602,306 B2
(45) Date of Patent: Aug. 5, 2003

(54) ARTIFICIAL FIRELOG WITH CRACKLING ADDITIVES

(75) Inventors: Andrew T. Scott, Portland, OR (US); Eric D. Barford, Stockton, CA (US); James E. Houck, Portland, OR (US)

(73) Assignee: Duraflame, Inc., Stockton, CA (US)

( * ) Notice: Subject to any disclaimer, the term of this patent is extended or adjusted under 35 U.S.C. 154(b) by 0 days.

(21) Appl. No.: 09/837,144

(22) Filed: Apr. 18, 2001

(65) Prior Publication Data

US 2002/0184815 A1 Dec. 12, 2002

(51) Int. Cl.⁷ .................................................. C10L 5/00
(52) U.S. Cl. .............................. 44/535; 44/591; 44/607; 44/589
(58) Field of Search ........................ 44/535, 591, 607, 44/589

(56) References Cited

U.S. PATENT DOCUMENTS

| 678,346 | A | | 7/1901 | Mettler et al. | |
|---|---|---|---|---|---|
| 3,637,355 | A | * | 1/1972 | Brockbank | 44/535 |
| 3,829,297 | A | * | 8/1974 | Crawford | 44/551 |
| 4,169,709 | A | * | 10/1979 | Stima | 44/530 |
| 4,333,738 | A | | 6/1982 | Schrader | |
| 4,654,049 | A | | 3/1987 | Smith, Jr. | |
| 5,118,539 | A | | 6/1992 | Sebby et al. | 428/15 |
| 5,868,804 | A | | 2/1999 | Williams et al. | 44/535 |
| 6,017,373 | A | | 1/2000 | Frisch | 44/535 |

FOREIGN PATENT DOCUMENTS

FR        2578551 A    *  9/1986

* cited by examiner

*Primary Examiner*—Cephia D. Toomer
(74) *Attorney, Agent, or Firm*—Koppel, Jacobs, Patrick & Heybl

(57) ABSTRACT

An artificial firelog comprising a mixture of combustible materials and a combustible binder further contains particulate coke comprising about 1% to about 35% by weight of the firelog, the coke particles having a size less than about 4 mm, to create a realistic crackling sound that mimics the sounds produced during the burning of natural logs. The particulate coke has a preferred moisture content between about 2% and about 20% by weight. The particulate coke may be combined in predetermined ratios with other established crackle additives including natural additives such as coriander seed to extend the time period during which the burning artificial firelog crackles. Preferably, the particulate coke comprises metallurgical coke.

15 Claims, 2 Drawing Sheets

ARTIFICIAL FIRELOG WITH CRACKLING ADDITIVES

BACKGROUND OF THE INVENTION

1. Field of the Invention

The present invention relates generally to artificial firelogs containing additives that create a crackling sound accurately mimicking the sounds produced during the burning of natural wood logs.

2. Description of the Prior Art

Artificial or synthetic fireplace logs are manufactured from a broad range of flammable cellulosic components in combination with a binder, and possibly other additives. Typical flammable cellulosic components include wood particles, pulp, shavings or chips, sawdust, ground bark, shredded paper or cardboard, waxed cardboard, charcoal powder, spagnum moss, and agricultural waste materials such as straw, bagasse, grass clippings, leaves, cotton linter, rice hulls, peanut or other nut shells and coffee grounds. The binder is typically a flammable wax such as paraffin wax or slack wax or flammable vegetable oils such as stearic and/or paimitic acid or other fatty acids or esters. However, numerous other combustible components are used or could be used and the foregoing lists of materials are not intended to limit the composition of flammable artificial firelogs for purposes of the present invention. Further, as is well known, artificial firelogs may also contain additives including chemicals designed to color or otherwise modify or retard the flame, add aroma or change the burning characteristics to more closely mimic the burning of natural logs.

A single artificial log, which may weigh 5–6 pounds, is designed to burn unattended for about 3–4 hours. For comparison, a 5–6 pound natural oak log will burn for about ⅓ of that time. To get a comparable burning time, 3 natural firelogs of 5–6 pounds are generally burned at one time. Also, to sustain a 3–4 hour burn with the desired ambience and flame intensity, it is often necessary to stir the natural log fire and turn over the logs for a relatively uniform and intense burn.

Natural burning logs generate an audible snapping, popping and crackling sound as the moisture and oils naturally occurring in the wood are heated, creating steam and vapor. This expanding steam and vapor causes the wood to crack creating the sounds. However, these sounds do not persist throughout the burning cycle. As the wood is heated by the surrounding flames, the vaporizable components are dissipated long before the natural log stops burning. As a result, the sounds start as the natural wood starts to burn, increases in a random, but persistent manner for a period of time followed by a tapering off of the frequency of the sound. This is illustrated in FIG. 1, a graphical representation of the intensity of the sounds produced as a function of time during the first 1½ hours of burning of a 6.6 pound natural pine cordwood log. The longevity, persistence and frequency of the sounds produced by burning a natural firelog depends on the moisture and oil content of the natural wood and the density and hardness of the wood. However, for typical natural firewood, the sounds persist for about one-half of the burning cycle.

In the absence of crackling additives, artificial firelogs burn much more quietly than natural logs. Accordingly, artificial firelogs that contain crackling additives have been developed in an effort to simulate the sound intensities and patterns produced during the burning of a natural log. For example, U.S. Pat. No. 5,118,539 to Sebby, et al., discloses artificial firelogs containing crackling additives in the form of seeds found in bird food mix, particularly hemp, millet and sunflower seeds, to provide a popping sound. U.S. Pat. No. 5,868,804 to Williams, et al., is directed to an artificial log having a crackling additive consisting of 1) mustard, flax, cumin, or sesame seed, or a combination thereof, 2) synthetic hollow spheres or microspheres, or 3) a combination of seed component and microspheres, to provide an audible crackling sound during burning of the logs.

These prior art compositions either have a very short lived popping sound or the sound persists for a significantly longer portion of the burning cycle, thus creating an unrealistic simulation of the burning of natural logs, or the sound is not of a quality or volume to simulate burning of natural logs. Often, there is little randomness or change in sound intensity during the burn. Accordingly, there has been a need for a synthetic log that more closely simulates the actual performance of burning natural logs.

U.S. Pat. No. 6,017,373, issued Jan. 25, 2000, to Frisch and incorporated herein by reference in its entirety, discloses artificial firelogs comprising one or more flammable materials, preferably cellulosic materials, and a wax binder blended and shaped in the manner typical of the artificial logs available in the past. Coriander seed is added to this composition during fabrication of the artificial log. The seed produces a random popping sound, with a volume similar to burning natural wood logs, for about 50% of the burning cycle of the log. The seed may be supplemented by replacing up to about one third of the seed with an equal percentage of naturally occurring geological materials of volcanic origin if a consistent popping sound is desired throughout the remainder of burning cycle of the artificial log. The objective of adding these materials is to generate sound more typical of burning natural logs.

Artificial firelogs in accordance with Frisch provide a substantial improvement in the simulation of the actual performance of burning natural firelogs but nevertheless there continues to be a need for artificial firelogs that even more closely simulate the performance of natural logs. In addition, the production of natural crackling additives such as coriander seed is seasonal and typically requires specialized conditions such as temperate growing zones.

SUMMARY OF THE INVENTION

In accordance with the broad principles of the present invention, there is provided an artificial firelog comprising combustible materials, a combustible binder and an effective amount of a sound generating additive to provide a crackling sound during at least a portion of the burning of the firelog wherein the crackling additive comprises particles of coke. Although a variety of "hard cokes" such as petroleum coke will provide the desired sound, the preferred coke for use in the artificial firelogs of the present invention comprises metallurgical or "met" coke.

In accordance with another aspect of the invention, the size of the particles of coke is preferably below about 4 mm.

The addition range of the particles of coke is preferably between about 1% and about 35% by weight of the firelog on a dry basis.

Pursuant to yet another aspect of the present invention, the particles of coke are provided with a moisture content between about 2% and about 20% by weight. Such moisture levels helps produce louder crackling sounds.

Pursuant to yet another specific embodiment of the artificial firelog of the present invention, besides particulate coke, the sound generating additive may also include sound generating natural seed such as coriander seed. More particularly, where the supplemental natural crackling additive is coriander seed, the ratio of coriander seed to particulate coke is preferably between about 1:1 to about 1:3, by weight.

BRIEF DESCRIPTION OF THE DRAWINGS

Further objects, features and advantages of the present invention will become evident from the detailed description of the preferred embodiments, below, when read in conjunction with the accompanying drawings in which.

DETAILED DESCRIPTION OF THE PREFERRED EMBODIMENTS

Figure 1:
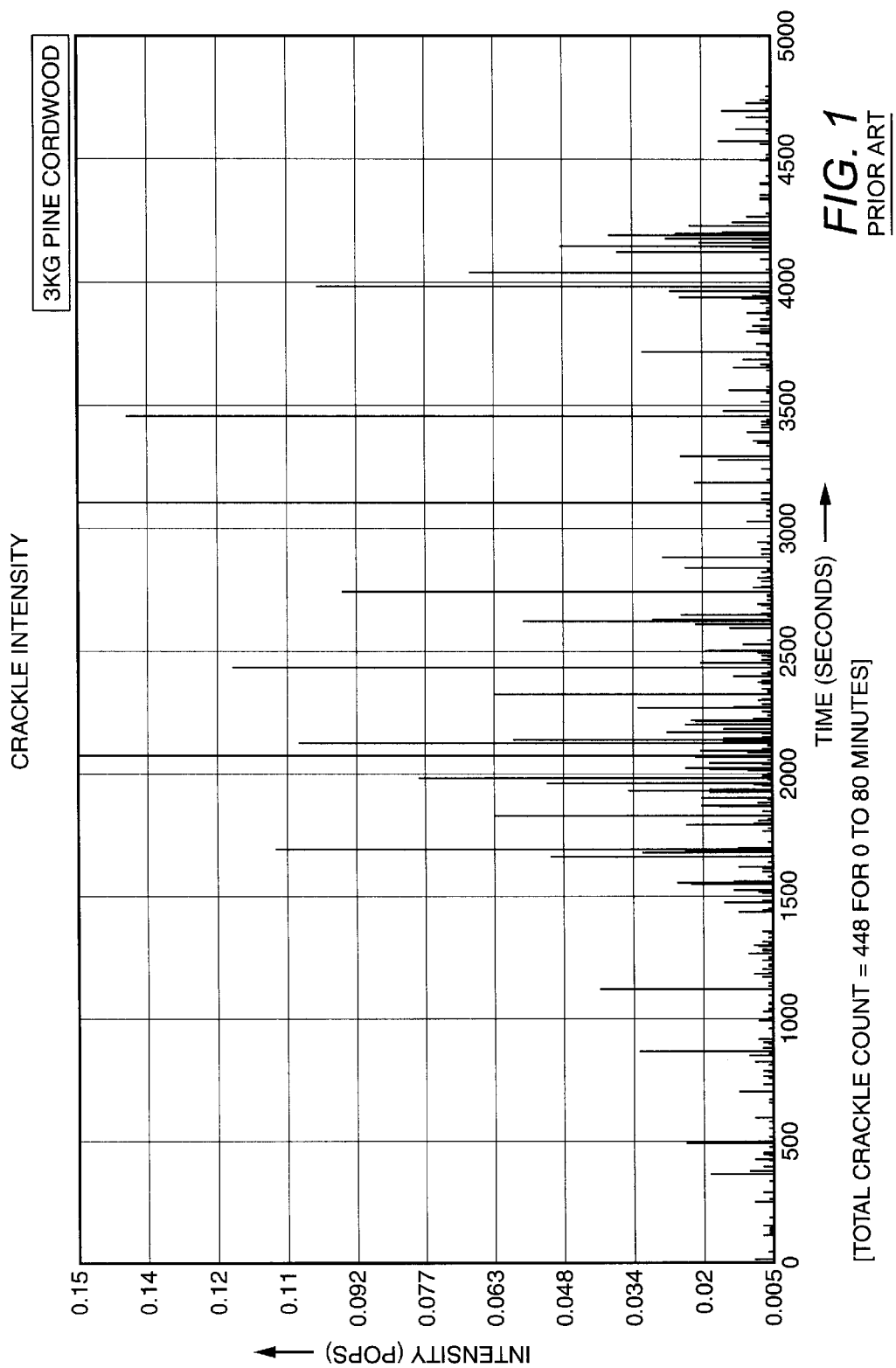
FIG. 1 is a graphical representation of the intensity of the sounds produced as a function of time during the burning of a natural log comprising pine cordwood.

Artificial firelogs in accordance with the present invention may be made of any of the many known, above-described combinations of flammable cellulosic materials and binders, with various optional chemical additives; the present invention is not limited to any particular basic artificial firelog formulation. Pursuant to the invention, added to the basic composition is a crackling additive in the form of particulate coke.

As is well known, coke is an impure form of carbon formed when coal is heated strongly in the absence of air to drive off volatile components. Coke is widely used as a reducing agent in metallurgical operations such as in the production of crude or pig iron from iron ore. Metallurgical or "met cokes" are produced from bituminous coals preferably having a low ash and sulfur content and, pursuant to a preferred embodiment of the invention, the particles of coke utilized in the artificial firelogs of the present invention comprise particles of metallurgical or met coke. However, any of the cokes known as "hard cokes" which are produced as a result of the low temperature pyrolysis of bituminous coal may be used.

Because coke is an industrial byproduct that is universally available, its production is non-seasonal in nature. Thus, it does not suffer from short production cycles as do natural products such as coriander and mustard seeds. Further, coke does not require special production conditions, for example, temperate growing zones required by natural products.

It has been determined that the following criteria are important for good crackling performance:

1. To avoid explosive ejection of material from the firelog out of the fireplace, the particle size of the coke should be below about 4 mm, and preferably below about 3 mm. By way of example, "breeze", the residue from the making of coke, may be graded, that is, crushed and sieved using well known techniques to obtain the required particle sizes. The particles of coke inherently vary randomly in both size (within the ranges specified above) and shape; it has been found that such variation in coke particulate size and shape is advantageous in that it provides a more random frequency and intensity to the crackle sound and for a longer period of the burn time.

2. The coke moisture level, although not critical for production of crackle, is important in producing a louder sound. Preferably, the coke moisture level, as a percentage by weight of the total weight of the coke (%w/w), should be between about 2% and about 20%, more preferably between about 5% and about 15%, and most preferably, between about 7.5% and about 12%.

3. The addition range of coke, as a percentage by weight of the total dry weight of the firelog (%w/w), is preferably between about 1% and about 35%, more preferably between about 2% and about 25% and most preferably between about 5% and about 20%.

It has also been found that the particulate coke crackling additive may be combined with other established crackle mediums such as those disclosed by Sebby, et al., Williams, et al., and Frisch. In accordance with a preferred embodiment of the invention, the particles of coke are supplemented by coriander seed, as disclosed by Frisch. Coriander seed provides a more rapid onset of the crackle sound than coke particles alone while the coke particles provide for a longer period of crackle during the log burn than coriander seed alone. For best results, the preferred ratio, by weight, of coriander seed to met coke should be about 1:1, more preferably 1:1.5, and most preferably, 1:3.0.

Preferably, the coriander seed comprises from about 1% to about 5% by weight of the firelog, and more preferably, about 2% by weight of the firelog.

Firelogs constituted as above provide a random crackling frequency with a wide sound range.

Generally, in accordance with one preferred, exemplary embodiment, an artificial firelog in accordance with the invention is formed from a mixture of cellulosic material and a wax binder comprising from about 25% to about 39% by weight of a cellulosic material and from about 40% to about 60% by weight of a flammable wax binder, the artificial log further comprising from about 1% to about 35% by weight of the firelog of metallurgical coke particles, the particles having a size less than about 4 mm.

The following are examples of artificial log products with representative compositions according to the present invention, and the methods used for their fabrication:

EXAMPLE 1

Test Product

| | |
|---|---|
| Microcrystalline or paraffin wax | 54% w/w |
| Wood fiber | 36% w/w |
| Metallurgical coke (containing 10% w/w moisture) | 10% w/w |

A mixture of 100 pounds of ground wood chips and sawdust was mixed in a vessel with 150 pounds of wax, the wax added being above its melting point. The moisture content of the wood chips and sawdust was below 3%w/w. This mixture was cooled to a temperature of 50° F. over ambient room temperature at which time 25 pounds of the mixture was removed and replaced with a like quantity of metallurgical coke particles below 4 mm in size and containing 10% w/w moisture. The particulate coke was dispersed evenly throughout the mixture by mixing for several minutes. This mixture was then allowed to cool to 5° F. over ambient room temperature at which time it was fed into an agitated extruder hopper which feeds a firelog extruder. A number of 5 pound firelogs were produced from the mixture.

The logs burned for about 3½ hours in a test fireplace. They provided a realistic wood-like crackle sound beginning at ignition and lasting for about 1¾ hours.

EXAMPLE 2

Test Product

| Microcrystalline or paraffin wax | 55% w/w |
| Wood fiber | 37% w/w |
| Metallurgical coke (containing 10 w/w moisture) | 6% w/w |
| Coriander seed | 2% w/w |

A mixture of 100 pounds of ground wood chips and sawdust was mixed in a vessel with 150 pounds of wax, the wax added being above its melting point. The moisture content of the wood chips and sawdust was below 3% w/w. This mixture was cooled to a temperature of 50° F. over ambient room temperature at which time 20 pounds of the mixture was removed and replaced with 15 pounds of (i) metallurgical coke particles below 4 mm in size and containing 10% w/w moisture and (ii) 5 pounds of coriander seed. The particulate met coke and coriander seed were dispersed evenly throughout the mixture by mixing for several minutes. This mixture was then allowed to cool to 5° F. over ambient room temperature at which time it was fed into an agitated extruder hopper which feeds a firelog extruder. A number of 5 pound firelogs were produced from the mixture. The logs burned for about 3½ hours in a test fireplace. They provided a realistic wood-like crackle sound beginning at ignition and lasting for about 1¾ hours.

Figure 2:
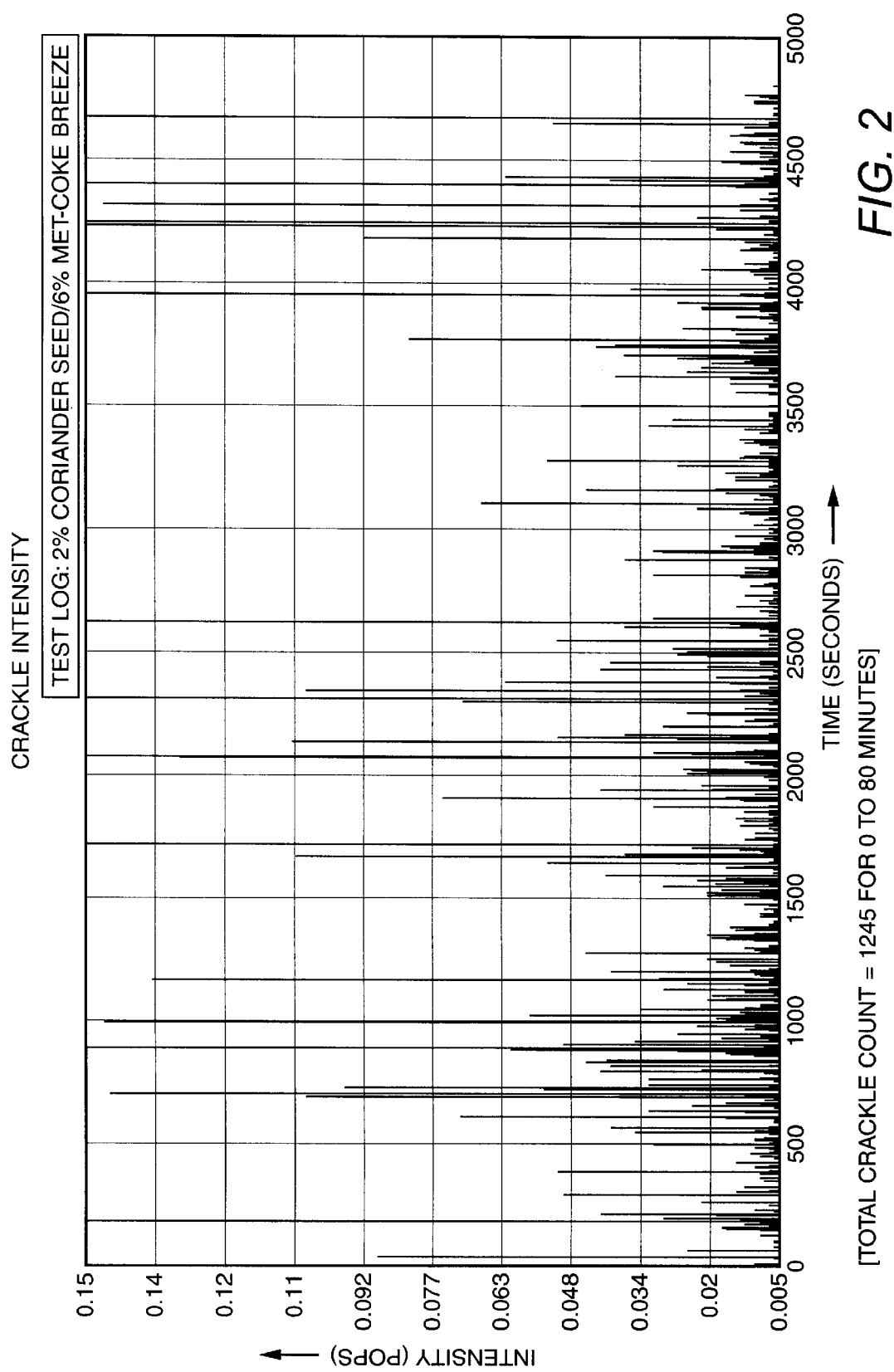
FIG. 2 is a graphical representation of the intensity of the sounds produced as a function of time during the burning of an artificial log in accordance with a specific, exemplary embodiment of the present invention, containing 6% by weight of sub-4 mm sized met coke breeze and 2% by weight of coriander seed.

FIG. 2 is a graphical representation of the crackling sound amplitude or intensity (in volts) produced as a function of time during the first 1½ hours of burning a firelog prepared according to Example 2. It will be seen that firelogs so constituted provide a random crackling frequency with a wide sound intensity range.

The graphical images of FIGS. 1 and 2 were produced by an electronic system, forming no part of the present invention, designed to provide a graphical representation of the sound pattern produced during a burning test. Generally, a microphone, mounted in front of the burning firelog, produces an output signal whose amplitude, in volts, represents sound intensity. The output signal is appropriately processed and then plotted as a function of time to produce graphs such as those of FIGS. 1 and 2.

In a commercial production process, a mixture of a ground cellulosic combustible material (such as wood chips, sawdust, cardboard, waxed cardboard, various agricultural bio mass, or a blend of these materials) and a flammable binder material (such as petrolatum, paraffin or slack waxes, molasses, fatty acids or stearic acids derived from vegetable or a blend of these materials) is prepared in a large industrial tank. The cellulosic combustible material is provided in a relatively dry condition (less than 5%w/w moisture content) in a percentage by weight of the total mixture ranging of about 36%. The flammable binder material is heated to at least its melting point and added to the mixture so that it constitutes about 54% by weight of the total mixture. In a continuous mixing system particulate metallurgical coke is added to the blended mixture of the cellulosic combustible material and the flammable binder with a horizontal mixing screw. The preferred mixture would contain from about 5 to about 10% by weight coke. This mixture is allowed to cool to about 5° F. over ambient temperature at which time it is fed into an agitated extruder hopper that feeds a firelog extruder. The mixture is extruded into various log like shapes of varying dimensions and weight. Depending on the size of the extruded product the logs will burn between about 2 hours to about 4 hours. Logs weighing 5 pounds have been demonstrated to burn for up to 3½ hours in a standard fireplace with a wood-like crackling sound. The crackling sound starts on ignition of the log and lasts for about 2 hours.

While the present invention has been described with reference to particular illustrative embodiments, the invention is not limited thereto. It will be appreciated that those skilled in the art can change or modify the described embodiments, or substitute equivalents for the various elements described and shown, without departing from the scope and spirit of the invention.

What is claimed is:

1. An artificial firelog comprising combustible materials, a combustible binder and an effective amount of a sound generating additive to provide a crackling sound during at least a portion of the burning of the firelog wherein the sound generating additive comprises particles of coke and wherein the particles of coke comprise particles of metallurgical coke.

2. An artificial firelog comprising combustible materials, a combustible binder and an effective amount of a sound generating additive to provide a crackling sound during at least a portion of the burning of the firelog wherein the sound generating additive comprises particles of metallurgical coke and wherein the particles of metallurgical coke have a moisture content between about 2% and about 20% by weight.

3. An artificial firelog comprising combustible materials, a combustible binder and an effective amount of a sound generating additive to provide a crackling sound during at least a portion of the burning of the firelog wherein the sound generating additive comprises particles of metallurgical coke and wherein the addition range of the particles of metallurgical coke is between about 1% and about 35% by weight of the firelog on a dry basis.

4. An artificial firelog comprising combustible materials, a combustible binder and an effective amount of a sound generating additive to provide a crackling sound during at least a portion of the burning of the firelog wherein the sound generating additive comprises particles of coke and at least one sound generating natural seed.

5. The artificial firelog of claim 4 wherein the at least one natural seed comprises coriander seed.

6. The artificial firelog of claim 5 wherein the ratio of coriander seed to particulate coke is between about 1:1 to about 1:3.

7. The artificial firelog of claim 5 wherein the coriander seed comprises about 2% by weight of the firelog.

8. The artificial firelog of claim 4 wherein the particles of coke comprise metallurgical coke.

9. The artificial firelog of claim 4 wherein the particles of coke comprise particles of hard coke.

10. A The artificial firelog of claim 9 wherein the particles of hard coke comprise petroleum coke.

11. An artificial firelog formed from a mixture of cellulosic material and a wax binder comprising from about 25% to about 39% by weight of a cellulosic material and from about 40% to about 60% by weight of a flammable wax binder, the artificial log further comprising from about 1% to about 35% by weight of the firelog of metallurgical coke particles, the particles having a size less than about 4 mm.

12. The artificial firelog of claim 11 wherein the size of the particles of metallurgical coke is below about 3 mm.

13. The artificial firelog of claim 11 wherein the particles of metallurgical coke have a moisture content between about 2% and about 20% by weight.

14. The artificial firelog of claim 11 further including coriander seed, the coriander seed comprising from about 1% to about 5% by weight of the firelog.

15. The artificial firelog of claim 14 wherein the ratio of the coriander seed to the metallurgical coke particles is between about 1:1 to about 1:3.

* * * * *